: US 10,068,609 B1
(45) Date of Patent: Sep. 4, 2018

(54) VARIABLE FREQUENCY WRITE PATTERN GENERATION

(71) Applicant: Marvell International Ltd., Hamilton (BM)

(72) Inventors: Ahmed Hesham Mostafa, San Jose, CA (US); Zubir Adal, Union City, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/902,821

(22) Filed: Feb. 22, 2018

Related U.S. Application Data

(60) Provisional application No. 62/462,476, filed on Feb. 23, 2017.

(51) Int. Cl.
    G11B 5/09      (2006.01)
    G11B 5/02      (2006.01)
    G11B 20/10     (2006.01)
    G11B 5/596     (2006.01)
    G11B 5/012     (2006.01)

(52) U.S. Cl.
    CPC ...... G11B 20/1024 (2013.01); G11B 5/59688 (2013.01); G11B 20/10231 (2013.01); *G11B 5/012* (2013.01)

(58) Field of Classification Search
    CPC ............... G11B 2220/90; G11B 5/919; G11B 20/10009; G11B 5/09; G11B 20/1419; G11B 20/1403
    USPC .......................................... 360/22, 39, 42, 51
    See application file for complete search history.

(56) References Cited

U.S. PATENT DOCUMENTS

| | | | |
|---|---|---|---|
| 6,064,541 | A | 5/2000 | Sasamoto et al. |
| 6,369,967 | B1 | 4/2002 | Lam |
| 6,956,708 | B1 | 10/2005 | Sutardja et al. |
| 7,068,451 | B1 | 6/2006 | Wang et al. |
| 7,177,105 | B1 | 2/2007 | Sutardja |
| 7,585,542 | B2 | 9/2009 | Sutardja |
| 8,027,117 | B1 | 9/2011 | Sutardja et al. |
| 8,176,386 | B1 | 5/2012 | Sutardja et al. |
| 8,508,879 | B1 | 8/2013 | Zou et al. |
| 2009/0257334 | A1* | 10/2009 | Ogura .............. G11B 20/10009 369/59.23 |

* cited by examiner

*Primary Examiner* — Nabil Hindi

(57) ABSTRACT

In some implementations, a system includes a magnetic media disk and a read/write unit. The read/write unit includes a plurality of phase-locked loops (PLLs), an interpolator unit, a delay-locked loop, and a precompensation unit. The PLLs are configured to generate, using a reference clock signal, a first plurality of clock signals having different frequencies phases. The interpolator unit is configured to interpolate the first plurality of clock signals in accordance with a frequency offset signal to generate a single-phase clock signal. The delay-locked loop is configured to delay the single-phase clock signal in accordance with a PLL data clock signal to generate a second plurality of clock signals having different phases. The precompensation unit is configured to apply precompensation to the second plurality of clock signals to generate a timing signal for writing data to the magnetic media disk.

18 Claims, 3 Drawing Sheets

VARIABLE FREQUENCY WRITE PATTERN GENERATION

CROSS REFERENCE TO RELATED APPLICATIONS

This disclosure claims the benefit of priority under 35 U.S.C. § 119(e) of U.S. Provisional Application No. 62/462, 476 filed on Feb. 23, 2017, titled "Method in Generating Instantaneous Variable Frequency Write Pattern with Full Pulse Width Precompensation using Open Loop Frequency Control," the disclosure of which is hereby incorporated by reference in its entirety.

BACKGROUND

The present disclosure relates to generating timing signals for controlling read/write operations in rotating magnetic storage devices.

A hard disk drive (HDD) typically includes at least one disk having a magnetic medium for storing information. A surface of a disk includes radially spaced, concentric data tracks. Each data track is divided into data sectors. Embedded servo sectors forming servo wedges are written on the disk surface. The servo sectors provide information for positioning the read/write head over a track during read and write operations.

To maximize data density, data is written to the disk such that data density is substantially uniform throughout the disk. The disk is rotated at a constant angular velocity while varying the data rate from an inner diameter zone to an outer diameter zone. To vary the data rate, the data clock is synchronized to the speed of the disk relative to the position of the head.

A time base generator can be used to generate a clock signal for controlling the read and write frequency. The frequency can be changed at each servo wedge to provide an optimum bit error rate (BER) and improve average data density. This frequency change should settle within a servo gate period (e.g., approximately 160 nanoseconds). A time base generator in a HDD is typically based on a phase-locked loop (PLL) which has a settling time that is restrained by the update rate and stability inherent of the PLL (e.g., approximately 1 to 2 microseconds).

SUMMARY

The present disclosure describes systems and techniques for generating timing signals with fast frequency changes and fast changing frequency patterns. In general, in one aspect, a system includes a magnetic media disk and a read/write unit. The read/write unit includes a plurality of phase-locked loops (PLLs), an interpolator unit, a delay-locked loop, and a precompensation unit. The PLLs are configured to generate, using a reference clock signal, a first plurality of clock signals having different frequencies phases. The interpolator unit is configured to interpolate the first plurality of clock signals in accordance with a frequency offset signal to generate a single-phase clock signal. The delay-locked loop is configured to delay the single-phase clock signal in accordance with a PLL data clock signal to generate a second plurality of clock signals having different phases. The precompensation unit is configured to apply precompensation to the second plurality of clock signals to generate a timing signal for writing data to the magnetic media disk.

In another aspect, an apparatus includes circuitry that generates, using a reference clock signal, a first plurality of clock signals having different frequencies phases; circuitry that interpolates the first plurality of clock signals in accordance with a frequency offset signal to generate a single-phase clock signal; circuitry that delays the single-phase clock signal in accordance with another data clock signal to generate a second plurality of clock signals having different phases; and circuitry that applies precompensation to the second plurality of clock signals to generate a timing signal for writing data to the a magnetic media disk.

In another aspect, a method includes generating, using a reference clock signal, a first plurality of clock signals having different frequencies phases; interpolating the first plurality of clock signals in accordance with a frequency offset signal to generate a single-phase clock signal; delaying the single-phase clock signal in accordance with another data clock signal to generate a second plurality of clock signals having different phases; and applying precompensation to the second plurality of clock signals to generate a timing signal for writing data to the a magnetic media disk.

The described systems and techniques can be implemented so as to realize one or more of the following advantages. A timing signal with varying frequency and variable frequency patterns can be provided without incurring delay due to the settling of the time base generator. In a HDD, changing the frequency of the timing signal at each servo wedge during read/write operations may provide an optimum BER and improve average data density.

Details of one or more implementations are set forth in the accompanying drawings and the description below. Other features, objects, and advantages may be apparent from the description, the drawings, and the claims.

DETAILED DESCRIPTION

Various implementations of the present disclosure are discussed below in conjunction with an example of a HDD that includes a read/write unit that generates signals for controlling read/write operations. The techniques described in this disclosure are generally applicable to any system in which it is desirable to generate signals with fast frequency changes and/or fast changing frequency patterns. Accordingly, other implementations of systems can include components different than those described in the present disclosure. For example, the techniques described in the present disclosure can be applied to a communication system (e.g., a demodulator, a decoder, or a modem) that demodulates communication signals and to other suitable electronic applications.

Figure 1:
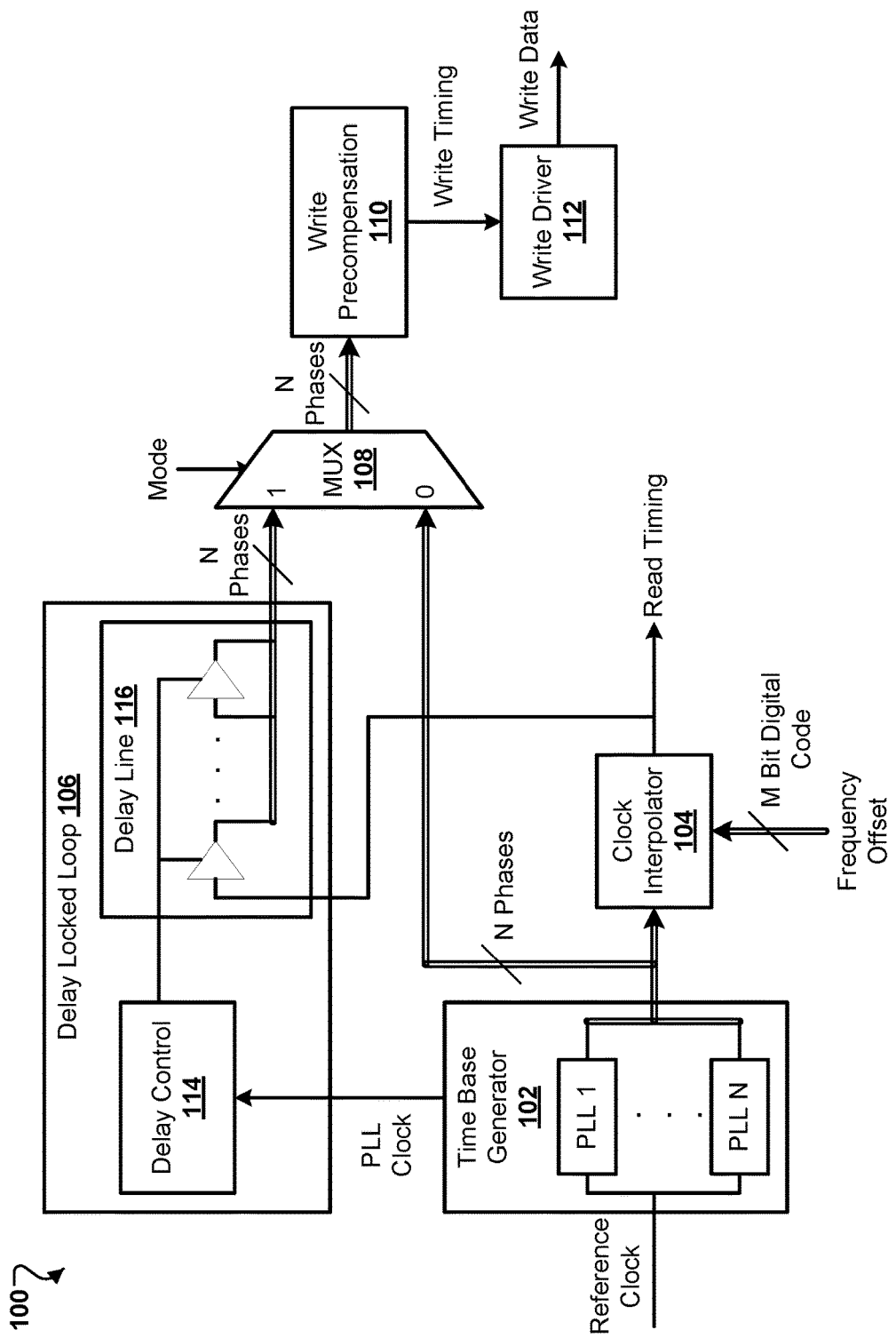
FIG. 1 is a block diagram showing an example of a read/write unit that can operate in a variable frequency write mode.

FIG. 1 is a block diagram showing an example of a read/write unit 100 that can operate in a variable frequency write mode. FIG. 1 provides one example of a read/write unit, and other components and configurations are possible. The read/write unit 100 generates timing signals for read/ write operations in a HDD. The read/write unit 100 includes a time base generator 102, a clock interpolator 104, a delay-locked loop (DLL) circuit 106, a multiplexer 108, a write precompensation unit 110, and a write driver 112. The DLL circuit 106 includes delay control circuit 114 and a delay line circuit 116.

To generate a read timing signal, the time base generator 102 receives a reference clock signal with a reference frequency (e.g., a frequency in the range of 25 MHz to 40 MHz). Using the reference clock signal, the time base generator 102 generates a clock signal having a frequency (e.g., in the range of 1 GHz to 5 GHz) and outputs N equally spaced phases of the clock signal (e.g., N phase output separated by 360 degrees/N). The time base generator 102 includes PLL circuits (shown in FIG. 1 as PLL 1 to PLL N) for generating the clock signal and the N equally spaced clock phases. A PLL circuit may include a phase comparator and an oscillator. Other PLL circuit configurations are possible, such as a PLL circuit that includes a frequency multiplier and/or a frequency divider.

The clock interpolator 104 receives the N equally spaced clock phases generated by the time base generator 102 via an N-bit line (e.g., an 8-bit line for 8 clock phases). The clock interpolator 104 selects pairs of clock phases and interpolates between them to provide a single-phase clock signal as the read timing signal. A frequency offset signal may be provided to the clock interpolator 104 for timing recovery. The number of bits in the frequency offset signal sets the resolution of the clock interpolator 104, and the number of clock phases impacts linearity error of the clock interpolator 104. For proper timing recovery, the signals used for the read and write operations should have the same frequency.

To use an instantaneous varying frequency for the write operation, the DLL circuit 106, which receives a single clock phase as input, is used to generate another set of N clock phases (e.g., another set of 8 clock phases) with the same frequency and different phases. Within the DLL circuit 106, the delay control circuit 114 receives a PLL clock signal having a phase and a frequency (e.g., in the range of 1 GHz to 5 GHz) from the time base generator 102. The PLL clock signal may be one of the multiple clock phases generated by the time base generator 102 (as described above), or the time base generator 102 may generate the PLL clock signal in addition to the multiple clock phases using the reference clock signal. Based on the clock signal received from the time base generator 102, the delay control circuit 114 generates a control signal that controls the time delay of delay elements used in the delay line and sets the clock phase spacing at 360 degrees/N at the output of the DLL circuit 106. The delay control circuit 114 may include a phase comparator and a bias circuit. Other delay control circuit configurations are possible, such as a delay control circuit that includes a multiplexer.

The delay line circuit 116 receives the read timing signal generated by the clock interpolator 104. The delay line circuit 116 includes a chain of delay elements, such as variable delay elements. The delay line circuit 116 receives the control signal from the delay control circuit 114, which controls the delay of the delay line circuit 116 such that the output frequency of the delay line circuit 116 is the same frequency as the read timing signal. Output signals of the DLL circuit 106 are equally spaced taps of the delay line circuit 116 (e.g., every tap or every other tap), which are provided as the set of clock phases output by the DLL circuit 106.

The delay of the delay line circuit 116 is determined by the delay control circuit 114 based on the PLL clock signal provided by the time base generator 102. The delay of the delay line circuit 116 is not affected by changes to the frequency offset signal provided to the clock interpolator 104. Similarly, the time base generator 102 is not affected by changes to the frequency offset signal provided to the clock interpolator 104. The frequency offset signal can thus be used to change the frequency of the read timing signal and the write timing signal without affecting the delay of the delay line circuit 116 and without incurring delay due to the settling of the time base generator 102.

When the N clock phases are received at the clock interpolator 104, the clock interpolator 104 adjusts the phase of the read timing signal based on a periodically changing frequency offset signal. The frequency offset signal can be used to precisely adjust (e.g., increase or decrease) the phase of the read timing signal. A digital code may be applied to the frequency offset input to adjust the phase of the read timing signal in the range of 1% to 2% at each servo wedge during read and write operations. The number of bits of the frequency offset signal controls the resolution of the phase shift being applied by the clock interpolator 104. For an M-bit frequency offset signal, the resolution of the phase at the output of the clock interpolator 104 is $1/(2^M)$. The adjustment of the phase causes a corresponding change in the frequency of the read timing signal. Because the read timing signal is provided to the delay line circuit 116 to generate the write timing signal, the change in the frequency of the read timing signal causes a corresponding change in the frequency of the write timing signal. Changing the frequency of the read and write timing signals at each servo wedge may provide an optimum BER and improve average data density. This frequency change can settle within a servo gate period (e.g., approximately 160 nanoseconds).

The set of clock phases generated by the time base generator 102 and the set of clock phases generated by the DLL circuit 106 are provided to inputs of the multiplexer 108. The multiplexer 108 receives a mode input for selecting between the two sets of clock phases. For the traditional write mode of operation, the multiplexer 108 provides the set of clock phases generated by the time base generator 102. For a variable frequency write mode of operation, the multiplexer 108 provides the set of clock phases generated by the DLL circuit 106. The multiplexer 108 provides the selected clock phases to the write precompensation unit 110.

The write precompensation unit 110 adjusts transitions of the write timing signal to correct for the influence of nearby transitions so that transitions in the recovered data are evenly placed. Such precompensation of data being recorded is accomplished by changing the timing of the magnetic flux reversal in a clock period to offset the magnetic transition shift and interference effects of adjacent and nearby bits. In this way, the transition shift of a bit due to the pattern of preceding and/or succeeding bits is anticipated and the bit recording time is changed to compensate for the magnetic transition shift due to the effects of surrounding bits. An example of a circuit suitable for implementing the write precompensation unit 110 is described in U.S. Pat. No. 6,956,708, the disclosure of which is hereby incorporated by reference in its entirety. The write precompensation unit 110 provides the write timing signal to the write driver 112, which latches out the write data based on the phase of the write timing signal.

Figure 2:
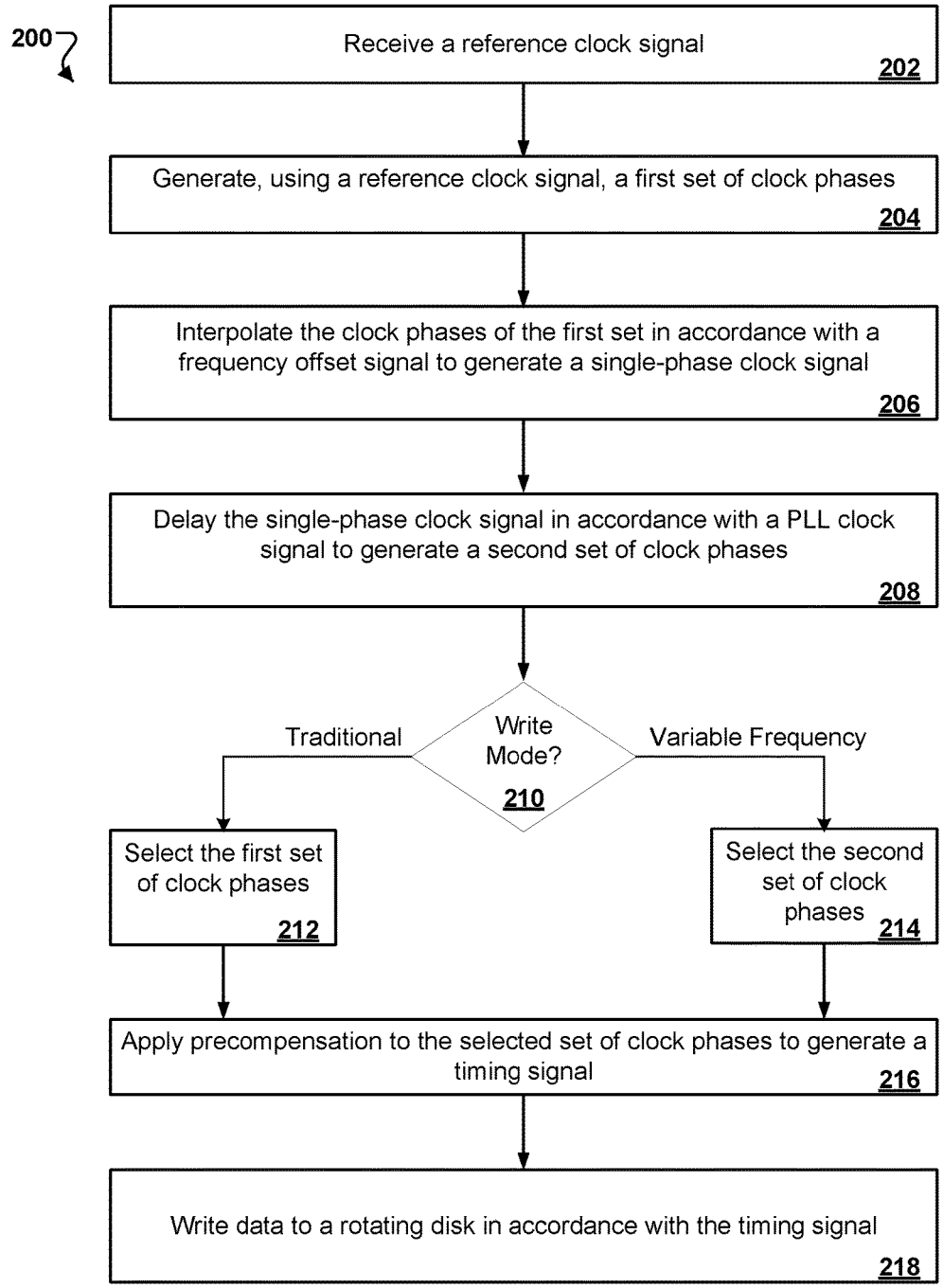
FIG. 2 is a flowchart showing examples of operations performed by the read/write unit during the variable frequency write mode of operation.

FIG. 2 is a flowchart showing examples of operations 200 performed by the read/write unit for the variable frequency write mode of operation. The operations 200 may include details that have been discussed above.

The read/write unit receives a reference clock signal (at 202). The reference clock signal is used to generate a first set of equally spaced clock phases (e.g., 8 clock phases) (at 204). The frequency of the clock phases in the first set may be in the range of 1 GHz to 5 GHz. The clock phases may be equally spaced across 360 degrees. The first set of clock phases may be generated by a PLL-based time base generator.

The clock phases in the first set are interpolated in accordance with a frequency offset signal to generate a single-phase clock signal (at 206). Interpolating the clock phases includes selecting pairs of clock phases and interpolating between the pairs. The frequency offset signal may be a digital code that is applied to adjust (e.g., increase or decrease) the phase of the single-phase clock signal in the range of 1% to 2% at each servo wedge during read and write operations. The single-phase clock signal (with the frequency offset) may be generated by a clock interpolator.

The single-phase clock signal is delayed in accordance with a PLL clock signal to generate a second set of clock phases (e.g., 8 clock phases) (at 208). The PLL clock signal is used to control the delay of the single-phase clock signal. The PLL clock signal may have a frequency in the range of 1 GHz to 5 GHz. The PLL clock signal may be one of the clock phases of the first set of clock phases, or it may be a clock signal different from the clock phases in the first set. The second set of clock phases may be generated by a DLL with signals at equally spaced taps of a delay line being provided as the second set of clock phases.

For a read/write unit that can operate in both a traditional write mode and the variable frequency write mode, a write mode selection is received (at 210). If the write mode selection indicates that the traditional write mode is enabled, the first set of clock phases is selected (at 212). If the write mode selection indicates that the variable frequency write mode is enabled, the second set of clock phases is selected (at 214). The write mode selection may be received by a multiplexer that selects between the first set of clock phases and the second set of clock phases based on the write mode selection.

Precompensation is applied to the selected set of clock phases to generate a timing signal (at 216). Precompensation may be applied by a precompensation circuit such as the precompensation circuit described in U.S. Pat. No. 6,956,708. Data is then written to a rotating disk in accordance with the timing signal (at 218). The data may be written by a write driver that latches out the write data based on the phase of the timing signal.

Figure 3:
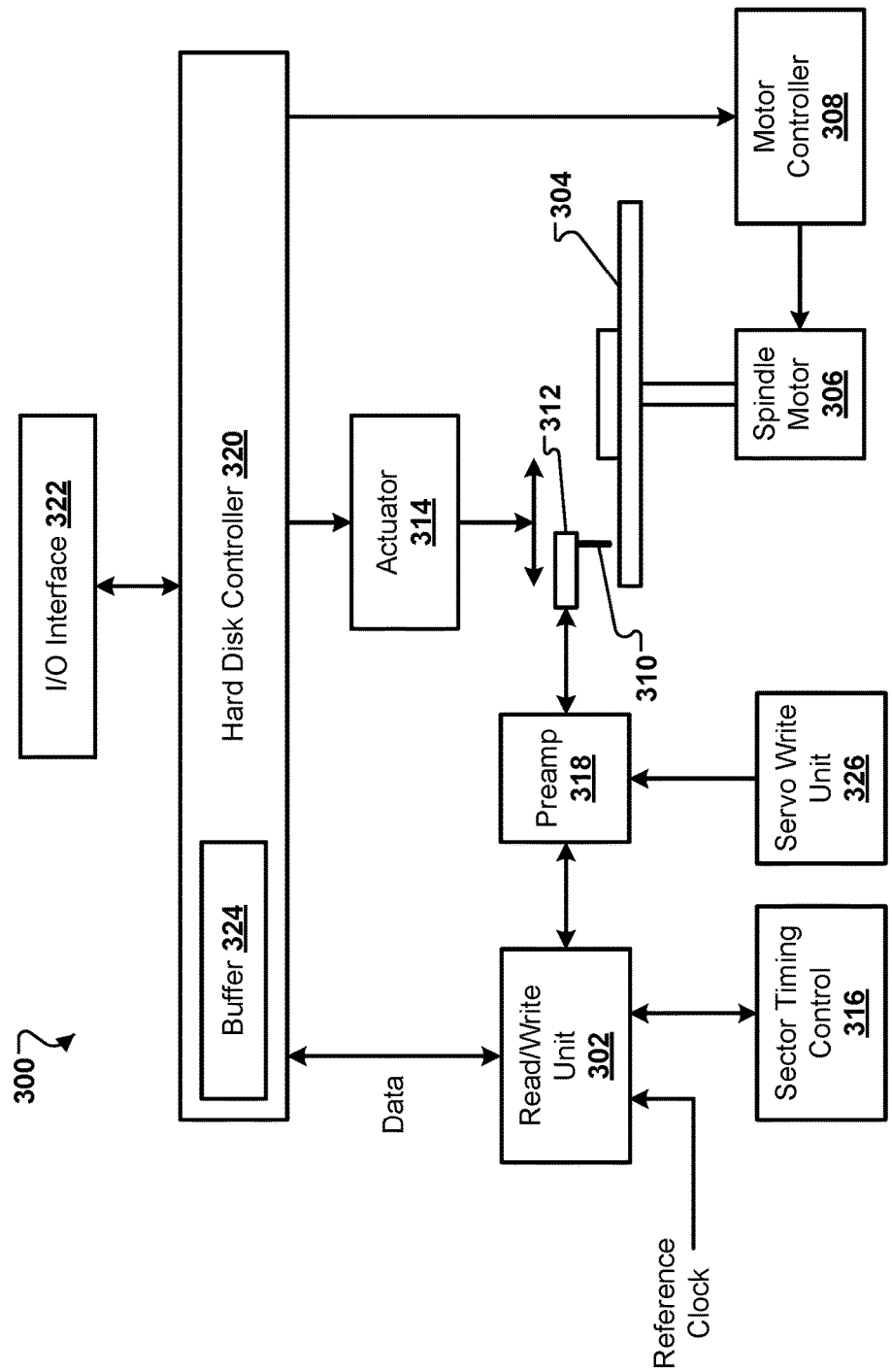
FIG. 3 is a block diagram showing an example of a HDD system including the read/write unit that can operate in the variable frequency write mode.

FIG. 3 is a block diagram showing an example of a HDD system 300 including a read/write unit 302 that can operate in a traditional write mode and a variable frequency write mode. The HDD system 300 includes a hard disk 304 having magnetic media. The hard disk 304 is rotated by a spindle motor 306. The motor controller 308 controls the spindle motor 306 to spin the hard disk 304 at a constant speed. While a constant speed is desirable, the speed varies within a certain tolerance.

A recording head 310 reads and writes data on the hard disk 304. The recording head 310 may include a write element such as an inductor that generates a magnetic field and a read element such as a magneto-resistive (MR) element that senses the magnetic field on the hard disk 304. The recording head 310 is mounted at a distal end of an actuator arm 312. An actuator 314, such as a voice coil motor (VCM) or a stepper motor, moves the actuator arm 312 relative to the hard disk 304 during read/write operations. The actuator 314 positions the recording head 310 over the proper data track, and data is transmitted to or from the read/write unit 302. A reference clock provides timing signals to the read/write unit 302. A sector timing control 316 synchronizes the reference clock with the disk rotation.

A preamplifier unit 318 amplifies signals generated by and input to the recording head 310. When reading data, the preamplifier unit 318 amplifies low-level analog signals received from the read element and outputs amplified analog signals to the read/write unit 302. The read/write unit 302 converts the analog signals into a digital format and outputs digital signals. The read/write unit 302 may filter the digital signals. The read/write unit 302 decodes the digital signals to generate the data read from the hard disk 304. The read/write unit 302 may detect and correct errors in the data read from the hard disk 304.

When writing data, the read/write unit 302 transmits data to be written to the preamplifier unit 318. Prior to transmitting the data to the preamplifier unit 318, the read/write unit 302 may encode the data using error correction coding (ECC), run length limited coding (RLL), and/or other suitable encoding techniques. The preamplifier unit 318 generates write current that flows through the write element of the recording head 310. The write current is switched to produce a magnetic field having a positive or a negative polarity. The positive or negative polarity is stored on the hard disk 304 and is used to represent binary data.

A hard disk controller (HDC) 320 controls various operations of the HDD system 300. For example, the HDC 320 generates commands that control the speed of the spindle motor 306 and the movement of the actuator arm 312. The motor controller 308 and the actuator 314 implement the commands and generate control signals that control the speed of the spindle motor 306 and the positioning of the actuator arm 312 during read/write operations.

The HDC 320 may communicate with an external device (not shown) such as a host adapter via the I/O interface 322. The HDC 320 may receive data to be written on the hard disk 304 and commands to read data from the hard disk 304 from the external device. Accordingly, the HDC 320 may transmit data to be written on the hard disk 304 to the read/write unit 302 and data read by the recording head 310 to the external device. The HDC 320 may include a buffer 324 to store data and commands. The buffer 324 may include volatile memory having low latency such as SDRAM.

In some implementations, the HDD system 300 includes a servo write unit 326 that writes servo on the hard disk 304 using the recording head 310 before the HDD system 300 can be used to store data. Servo, which includes positioning information, ensures that data is written to and read from correct locations on the hard disk 304. Servo is used to position the recording head 310 at correct locations on the hard disk 304 during read/write operations.

Portions of the HDD system 300 may be implemented by one or more modules. For example, the motor controller 308 and the actuator 314 may be implemented by a single module or by additional modules. Additionally, the read/write unit 302 and the servo write unit 326 may be implemented by a single module or by additional modules. In some implementations, the hard disk 304, the recording head 310, the actuator arm 312, and the preamp 318 may be implemented as a hard disk assembly (HDA). In some implementations, the I/O interface 322, the HDC 320, the actuator 314, the read/write unit 302, the sector timing control 316, the servo write unit 326, the spindle motor 306, and the motor controller 308 may be implemented by a single integrated circuit (IC) called a system-on-chip (SOC) or implemented as a printed circuit board (PCB).

A few implementations have been described in detail above, and various modifications are possible. The circuits described above may be implemented in electronic circuitry, such as the structural means disclosed in this specification and structural equivalents thereof. While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments. Other implementations fall within the scope of the following claims.

What is claimed is:

1. A hard disk drive system comprising:
   a magnetic media disk; and
   a read/write unit comprising:
   a plurality of phase-locked loops (PLLs) configured to generate, using a reference clock signal, a first plurality of clock signals having different phases;
   an interpolator unit configured to interpolate the first plurality of clock signals in accordance with a frequency offset signal to generate a single-phase clock signal;
   a delay-locked loop configured to delay the single-phase clock signal in accordance with a PLL clock signal to generate a second plurality of clock signals having different phases; and
   a precompensation unit configured to apply precompensation to the second plurality of clock signals to generate a timing signal for writing data to the magnetic media disk.

2. The system of claim 1, wherein the read/write unit comprises an additional phase-locked loop that generates the PLL clock signal using the reference clock signal.

3. The system of claim 1, wherein the frequency offset signal comprises a digital code that causes one or more adjustments of a phase of the single-phase clock signal during writing of the data to the magnetic media disk.

4. The system of claim 3, wherein the digital code causes an adjustment of the phase at each servo wedge.

5. The system of claim 1, wherein the read/write unit further comprises:
   a multiplexer configured to select either the first plurality of clock signals or the second plurality of clock signals for the precompensation.

6. An apparatus comprising:
   circuitry that generates, using a reference clock signal, a first plurality of clock signals having different phases;
   circuitry that interpolates the first plurality of clock signals in accordance with a frequency offset signal to generate a single-phase clock signal;
   circuitry that delays the single-phase clock signal in accordance with another clock signal to generate a second plurality of clock signals having different phases; and
   circuitry that applies precompensation to the second plurality of clock signals to generate a timing signal for writing data to a magnetic media disk.

7. The apparatus of claim 6, wherein the circuitry that generates the first plurality of clock signals comprises a plurality of phase-locked loops that receive the reference clock signal and generate the first plurality of clock signals using the reference clock signal.

8. The apparatus of claim 6, wherein the circuitry that delays the single-phase clock signal comprises a delay-locked loop configured to receive the another clock signal and the single-phase clock signal and delay the single-phase clock signal in accordance with the another clock signal to generate the second plurality of clock signals.

9. The apparatus of claim 6, wherein the apparatus comprises a phase-locked loop that generates the another clock signal using the reference clock signal.

10. The apparatus of claim 6, wherein the circuitry that interpolates the first plurality of clock signals comprises a clock interpolator that receives the frequency offset signal and interpolates the first plurality of clock signals in accordance with the frequency offset signal to generate the single-phase clock signal.

11. The apparatus of claim 6, wherein the frequency offset signal comprises a digital code that causes the circuitry that interpolates the first plurality of clock signals to apply one or more adjustments to a phase of the single-phase clock signal during writing of the data to the magnetic media disk.

12. The apparatus of claim 11, wherein the digital code causes the circuitry that interpolates the first plurality of clock signals to apply an adjustment to the phase at each servo wedge.

13. The apparatus of claim 6, further comprising circuitry that selects either the first plurality of clock signals or the second plurality of clock signals for the precompensation.

14. A method comprising:
   generating, using a reference clock signal, a first plurality of clock signals having different phases;
   interpolating the first plurality of clock signals in accordance with a frequency offset signal to generate a single-phase clock signal;
   delaying the single-phase clock signal in accordance with another clock signal to generate a second plurality of clock signals having different phases; and
   applying precompensation to the second plurality of clock signals to generate a timing signal for writing data to a magnetic media disk.

15. The method of claim 14, further comprising:
   generating the another clock signal using the reference clock signal.

16. The method of claim 14, wherein interpolating the first plurality of clock signals in accordance with the frequency offset signal comprises:
   receiving a digital code; and
   applying, in accordance with the digital code, one or more adjustments to a phase of the single-phase clock signal during writing of the data to the magnetic media disk.

17. The method of claim 16, wherein applying, in accordance with the digital code, the one or more adjustments of the phase to the single-phase clock signal during writing of the data to the magnetic media disk comprises:
    applying an adjustment to the phase at each servo wedge.
18. The method of claim 14, further comprising:
    selecting, from the first plurality of clock signals and the second plurality of clock signals, the second plurality of clock signals for the precompensation.

* * * * *